Figure 1:
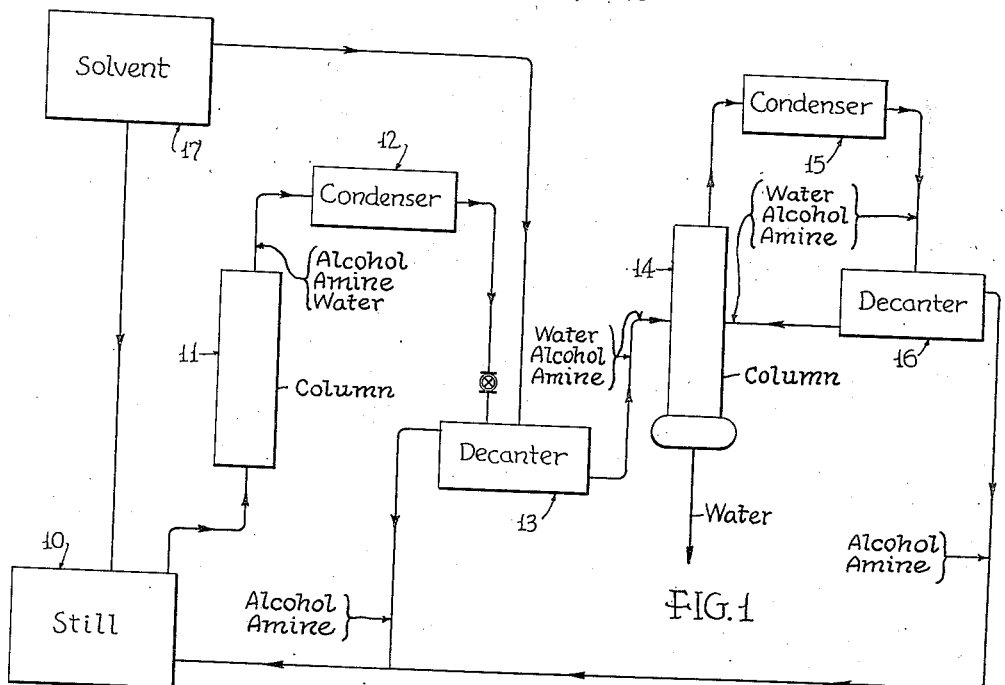

July 22, 1941.  T. E. DEGER  2,249,816

SEPARATION OF AMINES

Filed Nov. 8, 1938

INVENTOR:
Thomas E. Deger.
BY Maurice A. Crews
ATTORNEY

Patented July 22, 1941

2,249,816

UNITED STATES PATENT OFFICE 2,249,816

SEPARATION OF AMINES

Thomas E. Deger, Grosse Ile, Mich., assignor to Sharples Chemicals Inc., a corporation of Delaware Application November 8, 1938, Serial No. 239,496

11 Claims. (Cl. 202—42)

The present invention pertains to the separation of amines from mixtures containing as contaminations for said amines, water, alcohols, ethers and olefins. It was conceived in connection with research on problems encountered in the separation of mixtures produced by reacting alcohols with ammonia in the vapor phase.

When an alcohol is passed together with ammonia in the vapor phase over a dehydrating metal oxide, as described on pages 263 to 266 of Sabatier and Reid's "Catalysis in Organic Chemistry," (1923 edition), a mixture is formed consisting of the mono-, di-, and trialkylamines produced by reaction of the ammonia with the alcohol with the elimination of water, unreacted alcohol, water formed incident to the reaction, the ether corresponding to the alcohol employed in the process and the olefin corresponding to the alcohol employed in the process. In the case of separation from mixtures of this character of amines containing a total of less than 5 carbon atoms as substituents for hydrogen of ammonia, the problem of separation of the amino reaction products from the reaction mixture is not difficult. In the case of attempted separation of amines containing five or more carbon atoms as substituents for the hydrogen of ammonia, such as triethylamine, dibutylamine, and the amyl and hexyl amines, the problem of separation is very difficult, due to the tendency of the amines and the alcohol to form constant boiling mixtures with water.

A better understanding of the nature of the problem discussed in the last paragraph above can be had by consideration of the problems encountered in separation of amines from mixtures produced by vapor phase catalytic amination of butyl alcohol. In this case, the monobutylamine boils at 76° C., whereas the constant boiling mixture of normal butyl alcohol and water boils at 92.25° C. There is, therefore, no particular difficulty in the separation of the monobutylamine from the mixture by simple fractional distillation. When an attempt is made to effect separation of dibutylamine from this mixture, however, an entirely different situation exists. Dibutylamine and water form a constant boiling mixture which boils at about 95° C., and the separation of this constant boiling mixture from that of butanol and water boiling at 92.25° C. by distillation is, from a commercial standpoint, practically impossible.

The separation of mixtures of the character of the mixture of dibutylamine, water and alcohol into their constituents has heretofore been accomplished by a relatively complicated process involving acidification of the entire reaction mass to convert the amines into their corresponding salts. After such conversion, the other components of the mixture may be removed from the amine salts by distillation, leaving the salts as a relatively pure aqueous solution. This aqueous solution is then treated with a base to render it alkaline, and the amines may then be recovered, dehydrated and rectified. Such a process is very expensive, both because of the cost of reagents and heat, and because of the fact that it requires the use of special acid-proof apparatus.

Figure 2:
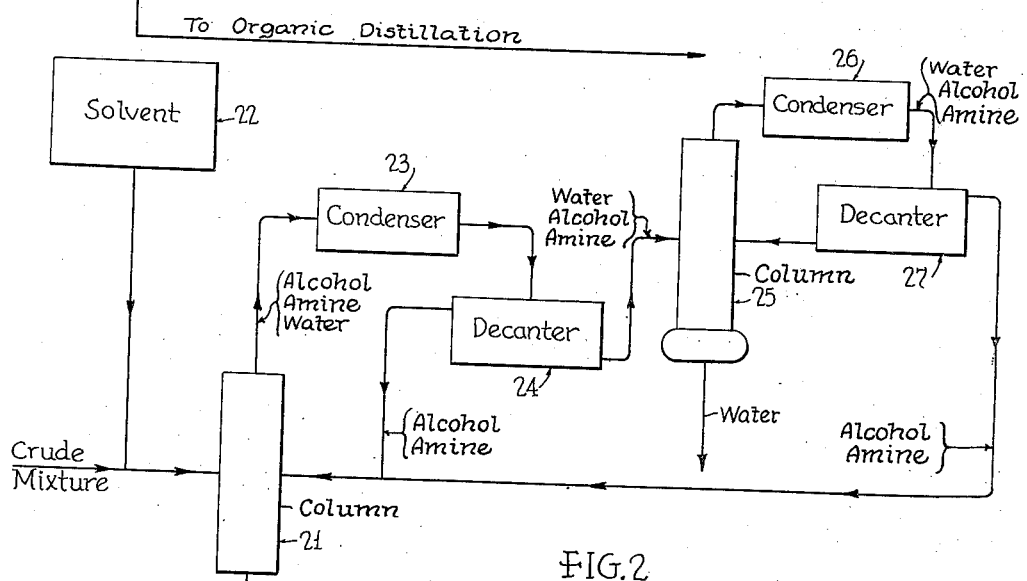

The principal object of the present invention has been to avoid the elaborate and expensive procedure involved in the above-described prior art process and to afford a process by which mixtures of the type of dibutylamine, alcohol and water may be simply and economically resolved into their respective constituents. An understanding of the invention may best be had by reference to the attached flow sheet, in which, Figure 1 is a diagrammatic illustration of apparatus for carrying out the process of the invention, Figure 2 is a similar view of an alternative embodiment.

Referring to the drawing by reference characters, the mixture of amine, water, alcohol and other constituents is passed to a still 10 and is heated until an azeotropic mixture passes overhead which contains the alcohol, the amine containing over five carbon atoms as substituents for hydrogen of ammonia, water, and possibly other constituents, depending upon the nature of such constituents present. This overhead fraction is passed to a fractionating column 11, and from this fractionating column to a condenser 12.

The liquefied mixture produced by condensation in the condenser 12 is then passed to a decanter 13. The material in the decanter 13 is separated into an upper layer, consisting principally of organic chemicals containing a small amount of water, and into a lower layer, consisting of water saturated with the alcohol of the azeotropic mixture and containing a small amount of the desired amine. The upper layer is preferably returned continuously to the still 10 in order to be dehydrated further and in order to assist in stripping from the material in the still the remainder of the water contained in the still.

The lower layer from the decanter 13 is passed to the column 14, where it is subjected to a further stripping operation for separating water from organic constituents in order to reclaim these organic constituents. In this stripping operation, the overhead fraction consists of a mixture of alcohol, the desired amine and other organic compounds, in case such compounds may be present, and a small quantity of water. The overhead fraction from column 14 is condensed in condenser 15 and passed to a decanter 16. Separation occurs in this decanter 16, which is similar to that occurring in decanter 13, and the aqueous fraction from the decanter 16 is returned to the column 14 in order to subject it to further fractionating to strip organic impurities from the water which it contains.

The upper layer from the decanter 16, consisting of the desired amine, alcohol, and other organic compounds, with but a trace of water, may be continuously returned to the still 10.

By the practice of the steps described above, the organic constituents of the mixture produced by catalytic amination of alcohols may be thoroughly dehydrated. After this dehydration is completed, the organic constituents may be very simply fractionated by ordinary distillation technique, since the special problem caused by the presence of water in the mixture of organic compounds to be fractionated has been solved by azeotropic dehydration of this mixture.

In the case of some mixtures of amines, alcohols and water, it will be desirable to add to the still 10 an additional entraining and dissolving liquid from container 17, such as hexane, benzene, toluene, or equivalent material. Such material serves the very important function of acting as a selective solvent for the organic fraction passed to the decanter 13, and it also assists in the fractional distillation from the still 10 by acting as an entraining liquid in connection with such distillation. In the case of separation of monohexylamine from its mixture with water and hexyl alcohol, for example, a difficult problem is encountered in the decantation step accomplished in decanter 13 unless such additional entraining liquid is added to the still 10. This problem is caused by reason of the fact that monohexylamine is substantially soluble in water. In the decantation operation performed in decanter 13 in connection with a simple mixture of monohexylamine, hexyl alcohol and water, a substantial amount of monohexylamine is separated therefrom in solution in the aqueous layer. This may be avoided by using hexane or benzene as an entraining liquid, since the presence of this liquid in the upper, organic, layer in the decanter 13 exercises a selective solvent action upon the organic compounds passed to the decanter 13, thereby preventing solution of a substantial amount of hexylamine in the aqueous layer.

As an alternative to the addition to the still 10 of a selective solvent for the amine, a selective solvent such as hexane or benzene may be added to the azeotropic mixture at some other point before it reaches the decanter 13, or it may be added in the decanter 13 itself. Addition in this manner affords the advantage of the selective solvent action of this added component, but it does not afford the advantage of the presence of the added component as an entraining liquid in the distillation operation.

The process of the present invention may be rendered continuous by introducing the crude mixture containing the amines, alcohol, water and other constituents directly into a distillation column, and continuously withdrawing purified organic constituents from the base of the still. Figure 2 of the drawing is a flow sheet illustrating such a continuous process.

In accordance with the modification of this figure of the drawing, the crude mixture containing amine, alcohol, water, etc., is introduced directly into a highly efficient stripping column 21. A binary vapor containing amine and alcohol is continuously passed overhead by distillation from still 20 into column 21, at such rate as to pass overhead in the form of a ternary constant boiling mixture, all of the water in the crude mixture entering the column 21, together with amine and alcohol. This mixture is condensed in condenser 23 and passed to decanter 24.

The mixture in decanter 24 separates in the same manner as the mixture in decanter 13, and the oil (upper) phase from the decanter 24 is continuously returned to the column 21 as illustrated. The aqueous phase from decanter 24 is similar to the aqueous phase from decanter 13 and is subjected to stripping and decantation steps in column 25, condenser 26 and decanter 27 of exactly similar nature to those described above with respect to column 14, condenser 15 and decanter 16. The oil (upper) phase from decanter 27 is continuously returned to the column 21.

By operating in this way, the mixture reaching the still 20 during the continuous operation contains only the organic constituents of the crude mixture which is being fractionated, and a part of the material in the still 20 can thereafter be continuously withdrawn from the still 20 and passed to distillation columns in which it is separated into its individual constituents by simple fractional distillation, this last-mentioned distillation being either batch or continuous, as desired. In case a solvent, such as that introduced in the embodiment of Figure 1 of the drawing from condenser 17 is found necessary or desirable in fractionation of the particular material subjected to the continuous process of Figure 2 of the drawing, such solvent may be continuously introduced into the crude mixture from container 22, or such solvent may be separately introduced into the column 21.

EXAMPLE 1.—*Separation of triethylamine from ethyl alcohol.*—The reaction product formed by the catalytic amination of ethyl alcohol is distilled in the reaction apparatus to remove unchanged ammonia. Upon analysis of the residue, it is found to contain 15% monoethylamine, 20% diethylamine and 12% triethylamine. In addition to these, there are also present 18% water, 5% ethyl ether and 30% unchanged ethyl alcohol. The mixture is placed on an efficient fractionating column and a cut taken boiling between 16° C. and 17° C. which is pure anhydrous monoethylamine. The temperature then rises to 35° C., at which temperature the ethyl ether passes overhead. At 56° C. a cut consisting substantially of anhydrous diethylamine is obtained. The fractionation is then stopped and cyclohexane is added in volume constituting one-half the volume of the residue remaining in the flask. The column is then fitted up with a decanter attached in such a manner that the lighter component can be returned to the reaction flask, the heavier component being continuously withdrawn from the system. Distillation, occurring smoothly at 56° C., takes place, accompanied by the withdrawal of a heavy layer of a mixture rich in water and alcohol and containing some hexane and triethylamine. When the dehydration was complete, this heavy layer was subjected to a stripping operation by which a mixture was taken overhead consisting of the organic substances containing but a small amount of water and leaving as a residue in the kettle only water. The overhead, consisting of hexane, alcohol, triethylamine and a little water was set aside for addition to a subsequent batch. The dehydrated mixture left in the flask after the azeotropic dehydration, was now found to consist of hexane, boiling at 69°, ethyl alcohol, boiling at 78°, and triethylamine boiling at 89.5°. Separation of the triethylamine was readily accomplished by fractional distillation. As an alternative the calculated quantity of benzene may be employed for the azeotropic dehydration of triethylamine-alcohol mixtures. In this event, separations are somewhat more rapid, but caution should be exercised in the avoidance of excesses of benzene, as its removal from anhydrous alcohol is difficult.

EXAMPLE 2.—*Separation of di- and tributyl-amines from wet butyl alcohol.*—A mixture containing 20 parts of monobutylamine, 15 parts of dibutylamine and 5 parts of tributylamine, in addition to 44 parts of butyl alcohol and 16 parts of water, obtained by catalytic amination of butanol with ammonia, is placed on an efficient fractionating column and distilled. At 76° C. the monobutylamine passed over and was condensed and collected in receiver 18. The butylamine obtained in this manner was substantially anhydrous and contained but traces of butyl alcohol. The distillation was then stopped and the column fitted with a decanter 13. Heat was again applied to the distillation flask and a mixture came over which separated in two layers. The upper layer, rich in butanol and dibutylamine, was returned to the reaction flask, while the lower layer, consisting of water saturated with butanol and containing a little dibutylamine, was withdrawn for subsequent stripping and reclamation of its organic content. When dehydration was complete, the decanter was removed and distillation continued in the normal manner. Anhydrous butanol was obtained as a cut boiling at 116° to 118°, dibutylamine boiling at 158° to 161° was obtained as a second cut, while the tributylamine was obtained as a cut boiling at 210° to 214° C. In each case, the purity of the amine cut was good. It should be pointed out that in the above example, due to the relative insolubility of the dibutylamine and tributylamine in water, the addition of a fifth component is not necessary and azeotropic dehydration may be accomplished by the alcohol and the amines themselves.

EXAMPLE 3.—*Azeotropic dehydration of mixtures containing the amylamines.*—A mixture containing 10 parts of monoamylamine, 10 parts of diamylamine and 10 parts of triamylamine in addition to 20 parts of water and 50 parts of mixed amyl alcohols, obtained by catalytic amination of a mixture of amyl alcohol, was placed in a distillation flask. To this was added one-half its volume of benzene, the flask was attached to a column, fitted with a condenser and decanter and azeotropic dehydration was commenced. The heavy layer was found to consist of water with small quantities of monoamylamine, benzene and amyl alcohol present. When the dehydration was complete, the decanter was removed and distillation begun. The first cut consisted of benzene boiling at 78° to 80° C. The second cut consisted of anhydrous monoamylamines boiling from 90° to 105° C. Penta-sol, boiling at 125 to 142° was then removed, leaving a residue consisting of amyl ether in small quantities, boiling point 175° to 190°, diamylamine, boiling point 190° to 205° and triamylamine boiling at 240° to 258° C.

Modifications will be obvious to those skilled in the art, and I do not, therefore, wish to be limited except by the scope of the sub-joined claims.

I claim:

1. A process of separating into its constituents a mixture resulting from the amination of an aliphatic alcohol and containing an aliphatic amine having at least five carbon atoms, water, and unreacted alcohol, comprising passing overhead from said mixture an azeotropic mixture of the amine, water and alcohol, condensing the overhead fraction so obtained, decanting the resulting condensate to obtain a decanted fraction containing organic constituents of said overhead fraction from which a large part of the water of said overhead fraction has been removed, returning said decanted organic fraction to the distillation step of the process to assist in the removal of water in the continued practice of the process, continuing the distillation by the continued performance of the sequence of steps defined above until substantially all of the water has been removed from the organic constituents, and thereafter separating said organic constituents from each other by fractional distillation.

2. A process of separating into its constituents a mixture resulting from the amination of an aliphatic alcohol and containing an aliphatic amine having at least five carbon atoms, water, and unreacted alcohol, comprising passing overhead from said mixture an azeotropic mixture of the amine, water and alcohol, condensing the overhead fraction so obtained, decanting the resulting condensate to obtain a decanted fraction containing organic constituents of said overhead fraction from which a large part of the water of said overhead fraction has been removed, and an aqueous fraction containing some alcohol, returning said decanted organic fraction to the distillation step of the process to assist in the removal of water in the continued practice of the process, removing organic constituents from said decanted aqueous fraction by distillation, continuing the distillation by the continued performance of the sequence of steps defined above until substantially all of the water has been removed from the organic constituents, and thereafter separating said organic constituents from each other by fractional distillation.

3. A process of separating into its constituents a mixture resulting from the amination of an aliphatic alcohol and containing an aliphatic amine having at least five carbon atoms, water, and unreacted alcohol, comprising passing overhead from said mixture an azeotropic mixture of the amine, water and alcohol, condensing the overhead fraction so obtained, decanting the resulting condensate to obtain a decanted fraction containing organic constituents of said overhead fraction from which a large part of the water of said overhead fraction has been removed, and an aqueous fraction containing some alcohol, returning said decanted organic fraction to the distillation step of the process to assist in the removal of water in the continued practice of the process, removing organic constituents from said decanted aqueous fraction by azeotropic distillation, continuing the distillation by the continued performance of the sequence of steps defined above until substantially all of the water has been removed from the organic constituents, and thereafter separating said organic constituents from each other by fractional distillation.

4. A process of separating into its constituents a mixture resulting from the amination of an aliphatic alcohol and containing an aliphatic amine having at least five carbon atoms, water, and unreacted alcohol, comprising passing overhead from said mixture an azeotropic mixture of the amine, water and alcohol, condensing the overhead fraction so obtained, decanting the resulting condensate to obtain a decanted fraction containing organic constituents of said overhead fraction from which a large part of the water of said overhead fraction has been removed, and an aqueous fraction containing some alcohol, returning said decanted organic fraction to the distillation step of the process to assist in the removal of water in the continued practice of the process, removing organic constituents from said decanted aqueous fraction by distillation, returning said organic constituents removed from said aqueous decanted fraction to the first-mentioned distillation step to assist in the removal of water in the continued practice of the process, continuing the distillation by the continued performance of the sequence of steps defined above until substantially all of the water has been removed from the organic constituents, and thereafter separating said organic constituents from each other by fractional distillation.

5. A process as defined in claim 1, in which a separate organic entraining liquid for the water is added to the mixture subjected to the first distillation, and the mixture of dehydrated organic constituents is distilled after the completion of the azeotropic dehydration thereof to separate said organic constituents from each other.

6. A process as defined in claim 2, in which a separate organic entraining liquid for the water is added to the mixture subjected to the first distillation, and the mixture of dehydrated organic constituents is distilled after the completion of the azeotropic dehydration thereof to separate said organic constituents from each other.

7. A process as defined in claim 3, in which a separate organic entraining liquid for the water is added to the mixture subjected to the first distillation, and the mixture of dehydrated organic constituents is distilled after the completion of the azeotropic dehydration thereof to separate said organic constituents from each other.

8. A process as defined in claim 4, in which a separate organic entraining liquid for the water is added to the mixture subjected to the first distillation, and the mixture of dehydrated organic constituents is distilled after the completion of the azeotropic dehydration thereof to separate said organic constituents from each other.

9. A process as defined in claim 1, in which a compound adapted to selectively dissolve the amine and alcohol from admixture thereof with water is added to the mixture subjected to decantation in order to assist in the separation of organic constituents from water in the step of decantation.

10. A process of separating into its constituents a mixture resulting from the amination of an aliphatic alcohol and containing an aliphatic amine having at least five carbon atoms, water, and unreacted alcohol, comprising passing overhead from said mixture an azeotropic mixture of the amine, water and alcohol, condensing the overhead fraction so obtained, decanting the resulting condensate to obtain a decanted fraction containing organic constituents of said overhead fraction from which a large part of the water of said overhead fraction has been removed, and an aqueous fraction containing some alcohol, returning said decanted organic fraction to the distillation step of the process to assist in the removal of water in the continued practice of the process, subjecting said aqueous fraction to distillation to pass overhead from said aqueous fraction an azeotropic mixture of organic constituents and water, condensing said last-mentioned overhead fraction, decanting the condensate resulting from said last-mentioned condensation to obtain a decanted fraction containing organic constituents of said last-mentioned organic fraction from which a large part of the water of said last-mentioned overhead fraction has been removed, returning said last-mentioned decanted organic fraction to the first-mentioned distillation step of the process to assist in the removal of water in the continued practice of the process, continuing the distillation by the continued performance of the sequence of steps defined above until substantially all of the water has been removed from the organic constituents, and thereafter separating said organic constituents from each other by fractional distillation.

11. A process of separating into its constituents a mixture resulting from the amination of an aliphatic alcohol and containing an aliphatic amine having at least five carbon atoms, water, and unreacted alcohol, comprising passing overhead from said mixture an azeotropic mixture of the amine, water and alcohol, condensing the overhead fraction so obtained, decanting the resulting condensate to obtain a decanted fraction containing organic constituents of said overhead fraction from which a large part of the water of said overhead fraction has been removed, and an aqueous fraction containing some alcohol, returning said decanted organic fraction to the distillation step of the process to assist in the removal of water in the continued practice of the process, subjecting said aqueous fraction to distillation to pass overhead from said aqueous fraction an azeotropic mixture of organic constituents and water, condensing said last-mentioned overhead fraction, decanting the condensate resulting from said last-mentioned condensation to obtain a decanted fraction containing organic constituents of said last-mentioned organic fraction from which a large part of the water of said last-mentioned overhead fraction has been removed, and an aqueous fraction containing some organic constituents, returning said decanted organic fraction to the initial distillation step of the process to assist in the removal of water in the continued practice of the process, returning said last-mentioned decanted aqueous fraction to the distillation step of the process in which said first-mentioned aqueous fraction is subjected to further distillation to effect removal of organic constituents therefrom, continuing the distillation by the continued performance of the sequence of steps defined above until substantially all of the water has been removed from the organic constituents, and thereafter separating said organic constituents from each other by fractional distillation.

THOMAS E. DEGER.